United States Patent
Taillard

(10) Patent No.: US 11,077,831 B2
(45) Date of Patent: Aug. 3, 2021

(54) WINDSCREEN WIPER DEVICE

(71) Applicant: FEDERAL-MOGUL S.A., Aubange (BE)

(72) Inventor: Arthur Taillard, Herserange (FR)

(73) Assignee: Trico Belgium, Aubange (BE)

( * ) Notice: Subject to any disclaimer, the term of this patent is extended or adjusted under 35 U.S.C. 154(b) by 265 days.

(21) Appl. No.: 16/310,970

(22) PCT Filed: Jul. 8, 2016

(86) PCT No.: PCT/EP2016/066307
§ 371 (c)(1),
(2) Date: Dec. 18, 2018

(87) PCT Pub. No.: WO2018/006978
PCT Pub. Date: Jan. 11, 2018

(65) Prior Publication Data
US 2019/0176766 A1  Jun. 13, 2019

(51) Int. Cl.
*B60S 1/40* (2006.01)
*B60S 1/34* (2006.01)
*B60S 1/38* (2006.01)

(52) U.S. Cl.
CPC .......... *B60S 1/4048* (2013.01); *B60S 1/3427* (2013.01); *B60S 1/3868* (2013.01); *B60S 1/4045* (2013.01); *B60S 2001/4054* (2013.01)

(58) Field of Classification Search
CPC ........ B60S 1/40; B60S 1/4038; B60S 1/4045; B60S 1/4048; B60S 1/3427; B60S 1/3429;
(Continued)

(56) References Cited

U.S. PATENT DOCUMENTS 7,305,734 B2 * 12/2007 Boland ............... B60S 1/38
15/250.201
2013/0111691 A1 * 5/2013 Ozer ............... B60S 1/3868
15/250.31
(Continued)

FOREIGN PATENT DOCUMENTS

EP     1 795 406 A1   6/2007
WO   WO 2010/017861 A1   2/2010
WO      2013030130    *   3/2013

*Primary Examiner* — Gary K. Graham
(74) *Attorney, Agent, or Firm* — Miller Canfield

(57) ABSTRACT

A windscreen wiper device comprising an elastic, elongated carrier element (4), as well as an elongated wiper blade o(2) f a flexible material, which can be placed in abutment with a windscreen to be wiped, which wiper blade is of the flat blade type and includes at least one longitudinal groove (3), in which groove a longitudinal strip (4) of the carrier element is disposed, which windscreen wiper device comprises a connecting device (5) for an oscillating arm (6), wherein the oscillating arm is pivotally connected to the connecting device about a pivot axis near a free end thereof, with the interposition of a joint part (7), wherein the oscillating arm has an at least substantially U-shaped cross-section at the location of its connection to the joint part, and wherein the joint part is positioned at least substantially within the U-shaped cross-section of the oscillating arm, with the special feature that the oscillating arm and the joint part are interconnected by introduction of the joint part between legs of the U-shaped cross-section of the oscillating arm in longitudinal direction of the wiper blade, wherein an end side of the joint part facing towards the free end of the oscillating arm closes the U-shaped cross-section thereof from the outside.

9 Claims, 6 Drawing Sheets

(58) Field of Classification Search
CPC ............ B60S 1/3425; B60S 2001/4054; B60S 2001/4051; B60S 1/3868
USPC ...................................... 15/250.32, 250.351
See application file for complete search history.

(56) References Cited

U.S. PATENT DOCUMENTS

2014/0338143 A1* 11/2014 Bousset ................ B60S 1/4048
15/250.32
2016/0236656 A1* 8/2016 Malec ................... B60S 1/3853

* cited by examiner

WINDSCREEN WIPER DEVICE

BACKGROUND

1. Technical Field

The present invention relates to a windscreen wiper device comprising an elastic, elongated carrier element, as well as an elongated wiper blade of a flexible material, which can be placed in abutment with a windscreen to be wiped, which wiper blade is of the flat blade type and includes at least one longitudinal groove, in which groove a longitudinal strip of the carrier element is disposed, which windscreen wiper device comprises a connecting device for an oscillating arm, wherein the oscillating arm is pivotally connected to the connecting device about a pivot axis near a free end thereof, with the interposition of a joint part, wherein the joint part comprises at least one resilient tongue engaging in a correspondingly shaped hole provided in the oscillating arm, and wherein the resilient tongue is rotatable along an hinge axis between an outward position retaining the wiper blade onto the oscillating arm and an inward position releasing the wiper blade from the oscillating arm, wherein the oscillating arm has an at least substantially U-shaped cross-section at the location of its connection to the joint part, and wherein the joint part is positioned at least substantially within the U-shaped cross-section of the oscillating arm.

Particularly, the wiper blade comprises a spoiler at a side thereof facing away from the windscreen to be wiped, wherein the wiper blade and the spoiler are preferably made in one piece through extrusion. The longitudinal groove is preferably a central longitudinal groove accommodating the longitudinal strip. The longitudinal strip is also called a "flexor", while the connecting device is also indicated as a "connector". In the framework of the present invention the connector is preferably made in one piece, also called a "one piece connector", the joint part is preferably made of plastic.

It is noted that the present invention is not restricted to cars, but also refers to rail coaches and other (fast) vehicles.

2. Related Art

Such a windscreen wiper device is known from international patent publication no. WO 2010/017861 (Volkswagen). This prior art windscreen wiper blade is designed as a "yokeless" wiper blade or flat blade, wherein no use is made of several yokes pivotally connected to each other, but wherein the wiper blade is biased by the carrier element, as a result of which it exhibits a specific curvature. The wiper blade and the oscillating arm of the known windscreen wiper device are interconnected through a so-called "bayonet connection" wherein the resilient tongue on the joint part is initially pushed in against a spring force—as if it were a push button—and then allowed to spring back into the hole provided in the oscillating arm, thus snapping, that is clipping the resilient tongue into the hole. By subsequently pushing in again the resilient tongue against the spring force, the wiper blade may be released from the oscillating arm. The oscillating arm of the known windscreen wiper device is provided with an opening at its free end for sliding the joint part through this opening in order to connect the wiper blade to the oscillating arm thereof.

A disadvantage of the windscreen wiper device known from the above international patent publication is the following. In practice the joint part and the oscillating are made of mutually different materials, namely often plastic for the joint part and often metal or other type of plastic for the oscillating arm. Under the influence of UV light, rain, dust and ice, for example, these materials age over time, resulting in discoloration thereof. Mutually different colors for the joint part and the oscillating arm, due to the discoloration over time, is esthetically unattractive and, therefore, not accepted by the public.

SUMMARY

It is an object of the invention to obviate this disadvantage, in the sense that at minimum costs—without using complex machinery and additional tools—a simple though effective windscreen wiper device is proposed, wherein the effect of the discoloration is minimized.

Thereto, according to the invention a windshield wiper device mentioned in the preamble is characterized in that the oscillating arm and the joint part are interconnected by introduction of the joint part between legs of the U-shaped cross-section of the oscillating arm in longitudinal direction of the wiper blade, wherein an end side of the joint part facing towards the free end of the oscillating arm closes the U-shaped cross-section thereof from the outside. Thus, the oscillating arm has an at least substantially U-shaped cross-section at the location of its connection to the joint part, while an opening of the U-shaped cross-section facing towards the free end thereof is closed off by the joint part. Preferably, the joint part is introduced, particularly slid, between the legs from the outside in order to connect the joint part to the oscillating arm in a reliable, controllable and safe manner, when the oscillating arm is in its parking position. Hence, the location of the joint part inside the U-shaped cross-section of the oscillating arm with only the end side of the joint part being visible from the outside, ensures that, in case of any color differences between the joint part and the oscillating arm, only the end side has a different color (compared with the oscillating arm) visible from the outside.

The present windscreen wiper device is preferably a rear window windscreen wiper device.

It is noted that the present invention is not restricted to the use of only one longitudinal strip forming the elastic carrier element that is particularly located in a central longitudinal groove of the wiper blade. Instead, the carrier element may also comprise two longitudinal strips, wherein the strips are disposed in opposite longitudinal grooves of the wiper blade, the groove(s) may be closed at one outer end.

Further, it is noted that in the invention use is made of a mounting head fixed for rotation to a shaft, wherein the shaft is rotatable alternately in a clockwise and in a counter-clockwise sense carrying the mounting head into rotation. Thus, in turn the mounting head draws the connecting device into rotation and thereby moves the wiper blade. In the alternative, the mounting head is fixed for translation to a carriage, wherein the carriage can be translated alternately in a one linear direction and in another counter linear direction carrying the mounting head into translation. The present invention can therefore be used for circular or linear movement of the mounting head.

In a preferred embodiment of a windscreen wiper device in accordance with the invention the end side of the joint part is flush with the legs and a base of the U-shaped cross-section of the oscillating arm at the location of the free end of the oscillating arm. Hence, the oscillating arm does not exhibit on the base any seams between the oscillating arm and the joint part. On the contrary, the seams are only visible on a free end side of the oscillating arm extending perpendicular to the legs and the base. Thus, edges of the end side of the joint part are covered by the base and the legs of the oscillating arm.

In another preferred embodiment of a windscreen wiper device according to the present invention the hinge axis of the joint part is facing towards the free end of the oscillating arm. In the alternative, the hinge axis of the joint part is facing away from the free end of the oscillating arm.

In another preferred embodiment of a windscreen wiper device in accordance with the invention the hole of the oscillating arm is provided in a base of the U-shaped cross-section thereof. Preferably, the hole has a closed circumference.

In another preferred embodiment of a windscreen wiper device according to the present invention the joint part is attached to the connecting device by pivotally engaging protrusions of the connecting device, at the location of the pivot axis, in recesses provided in the joint part. Particularly, the joint part has an at least substantially U-shaped cross-section at the location of its attachment to the connecting device, and wherein the joint part in each leg of the U-shaped cross-section is provided with a recess provided coaxially with the pivot axis. Preferably, the protrusions extend outwards on either side of aid connecting device, wherein the protrusions are at least substantially cylindrical.

THE DRAWINGS

The invention will now be explained in more detail with reference to figures illustrated in a drawing, wherein.

Figure 5:
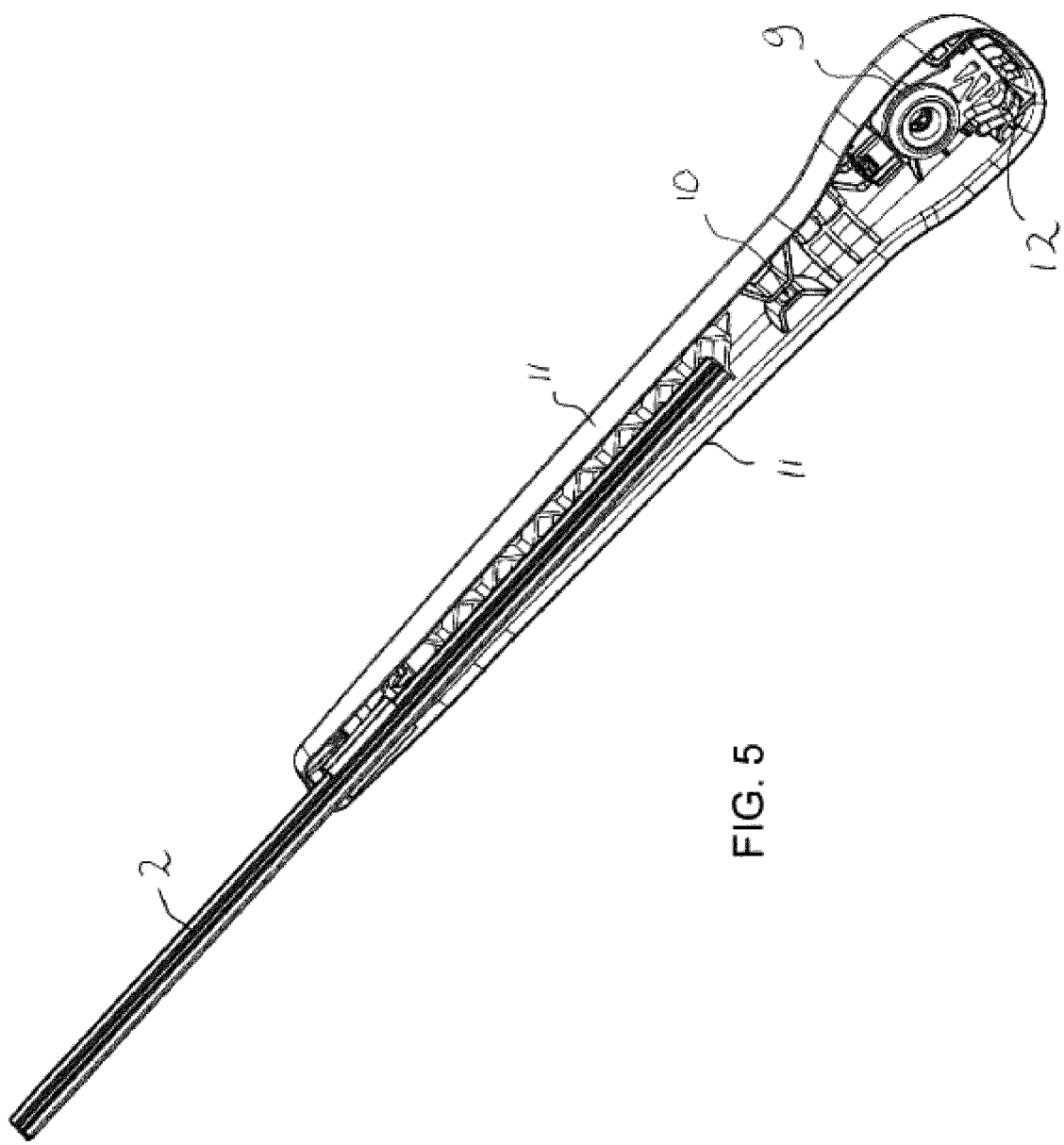
FIG. 5 is a schematic, perspective bottom view of the windscreen wiper device of FIG. 4.
Figure 6:
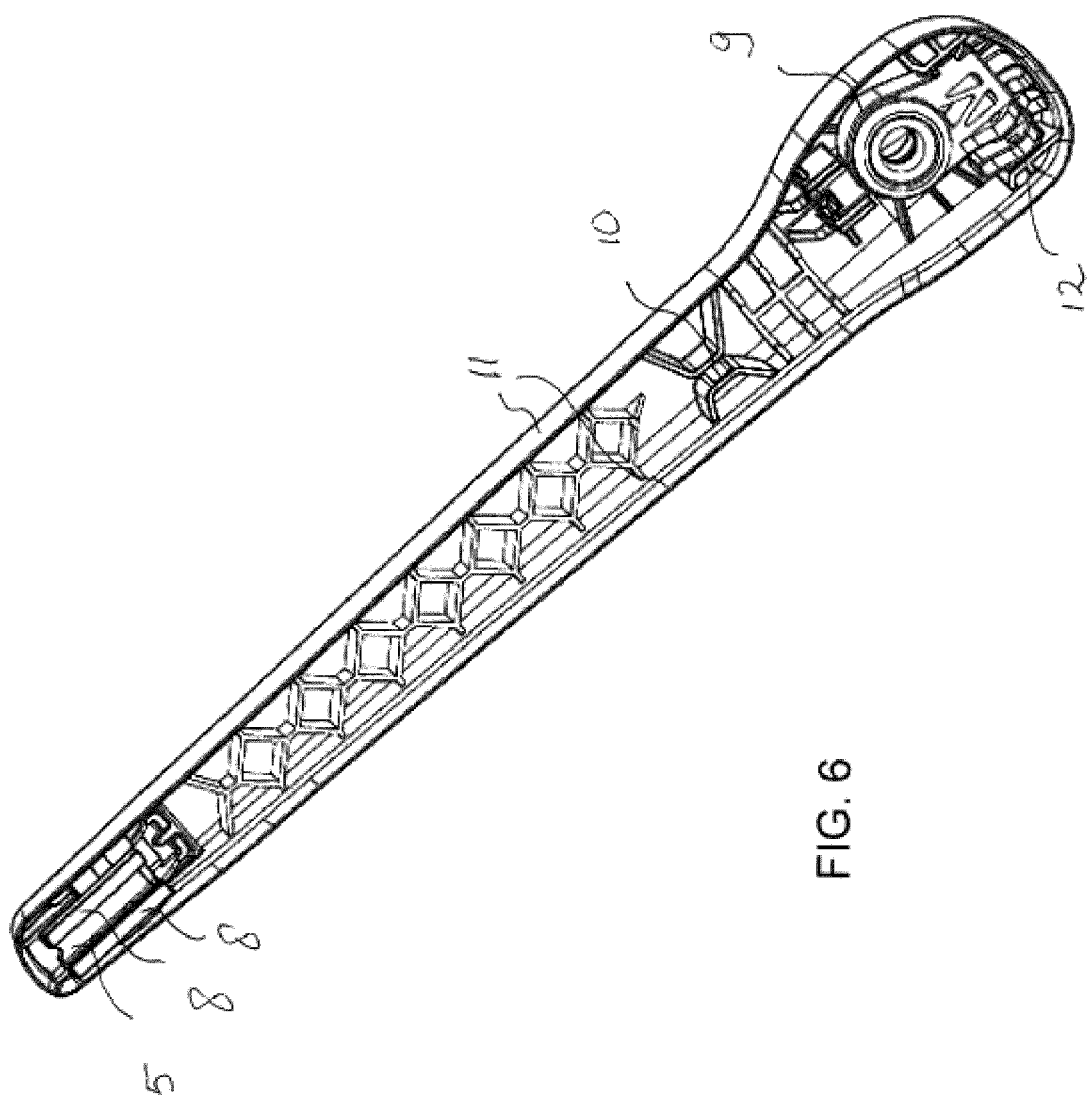

FIG. 6 corresponds to FIG. 5, but without showing a wiper blade connected to the connecting device.

DETAILED DESCRIPTION

Figure 1:
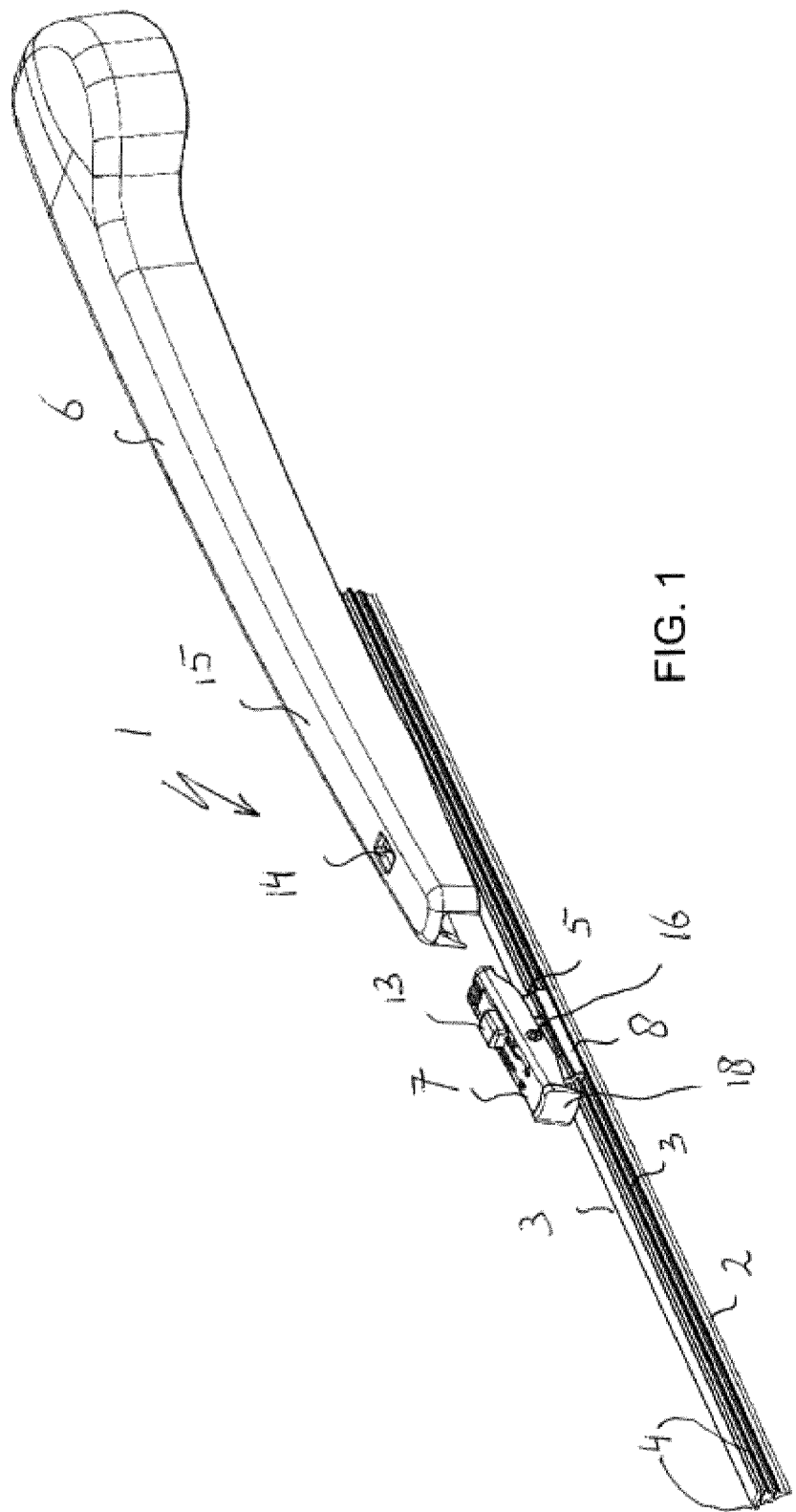
FIGS. 1 through 4 show various successive steps for fitting the joint part/connecting device and the oscillating arm of a windscreen wiper device together according to a preferred embodiment of the invention.

With reference to FIGS. 1 and 6, the windscreen wiper device 1 is arranged to be fitted on a rear side of a vehicle in order to wipe a rear window thereof. The windscreen wiper device 1 is built up of an elastomeric wiper blade 2, in the longitudinal sides of which opposing longitudinal grooves 3 are formed, and of longitudinal strips 4 made of spring band steel, which are fitted in the longitudinal grooves 3, the strips 4 form a flexible carrier element for the wiper blade 2, as it were, which is thus biased in a curved position (the curvature in operative position being that of a windscreen to be wiped).

The windscreen wiper device 1 is furthermore built up of a connecting device 5 of plastic material for pivotally connecting an oscillating arm 6 thereto, with the interposition of a plastic joint part 7. Alternatively, the connecting device 5 may also be made of metal, such as steel or aluminum. The connecting device 5 may comprise clamping members 8 that are integral therewith, which engage around longitudinal sides of the strips 4 that face away from each other, as a result of which the connecting device 5 is firmly attached to the unit consisting of the wiper blade 2 and the strips 4.

Figure 4:
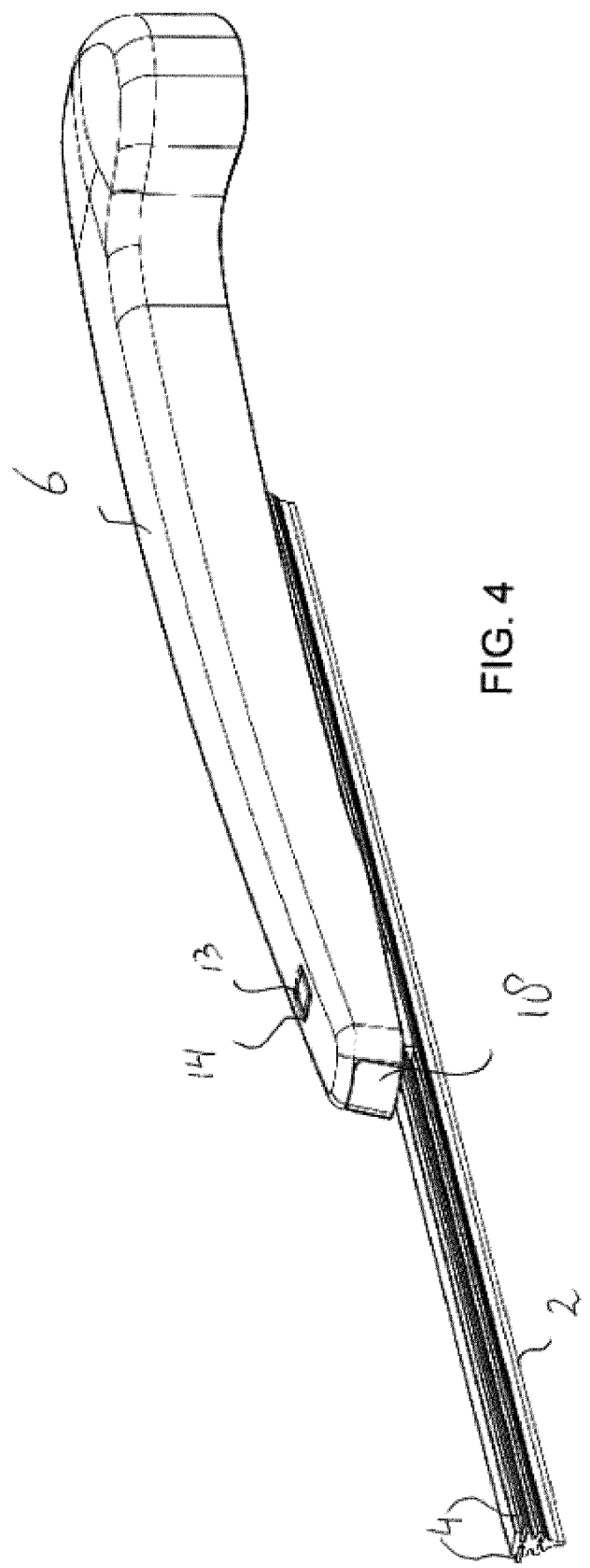

Although not illustrated in all detail, but clear to a person skilled in the art, the windscreen wiper device 1 according to the invention comprises a plastic or metallic mounting head 9 which can be fixed for rotation to a shaft (not illustrated) driven, via a mechanism not illustrated either, by a small motor. In use, the shaft rotates alternately in a clockwise and in a counter-clockwise sense carrying the mounting head 9 into rotation also, which in turn draws the oscillating arm 6 in rotation and thereby moves the connecting device 5 and thus the wiper blade 2 attached thereto. The mounting head 9 is detachably connected to the oscillating arm 6, as shown in FIG. 4. A spring (not shown) is hooked with its first end to a transverse bridge 10 between legs 11 of a U-shaped cross-section of the oscillating arm 6, whereas the spring is hooked with its second end on a pin 12 on the mounting head 9 to ensure that the oscillating arm 6 and thus the wiper blade 2 connected thereto is pressed onto a windscreen to be wiped.

With reference to FIGS. 1 through 4 the joint part 7 comprises one resilient tongue 13 extending outwardly, while the oscillating arm 6 has an U-shaped cross-section at the location of its connection to the joint part 7, so that the tongue 13 engages in an identically shaped hole 14 provided in a base 15 of the U-shaped cross-section.

Figure 2:
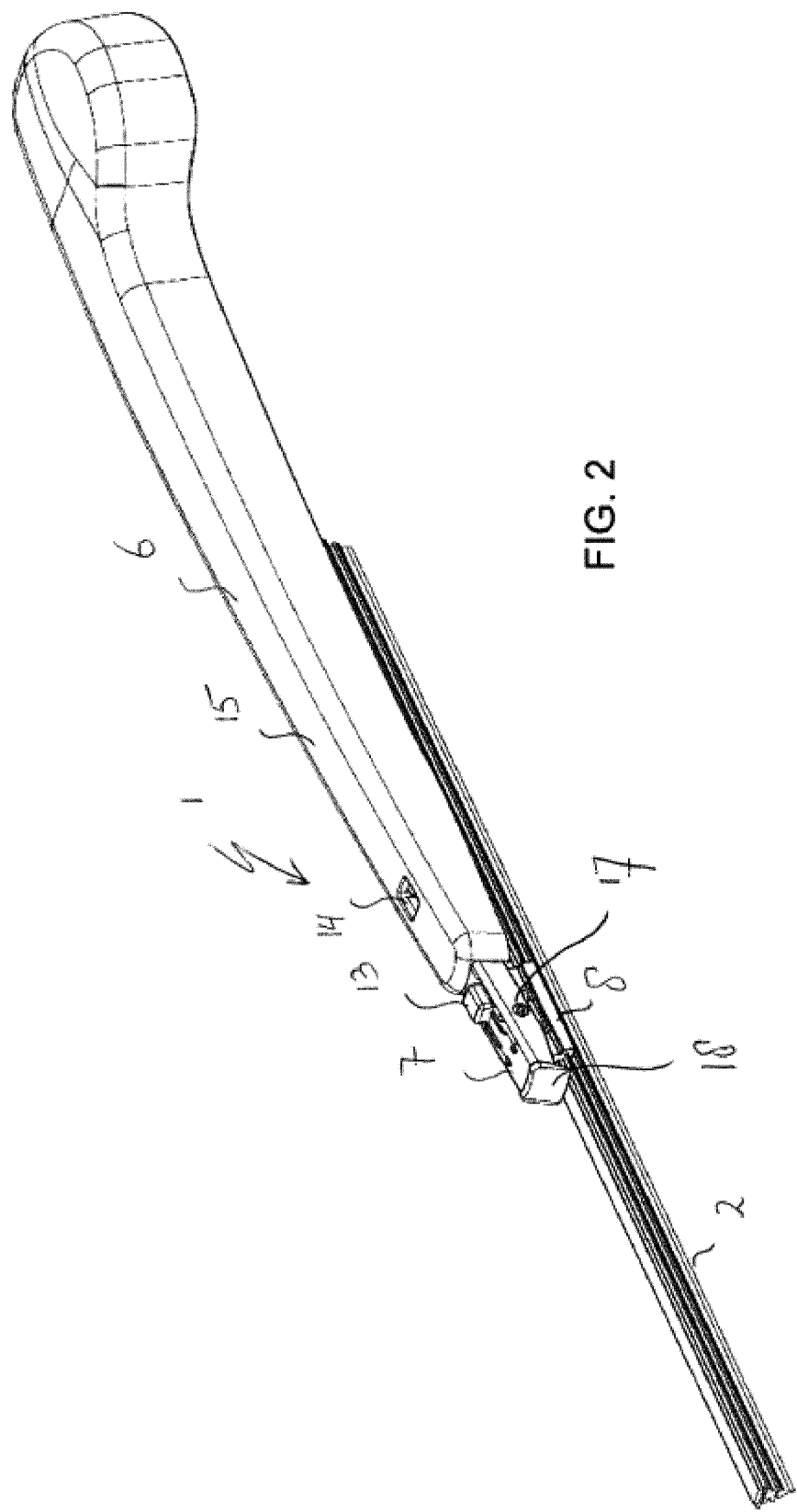
Figure 3:
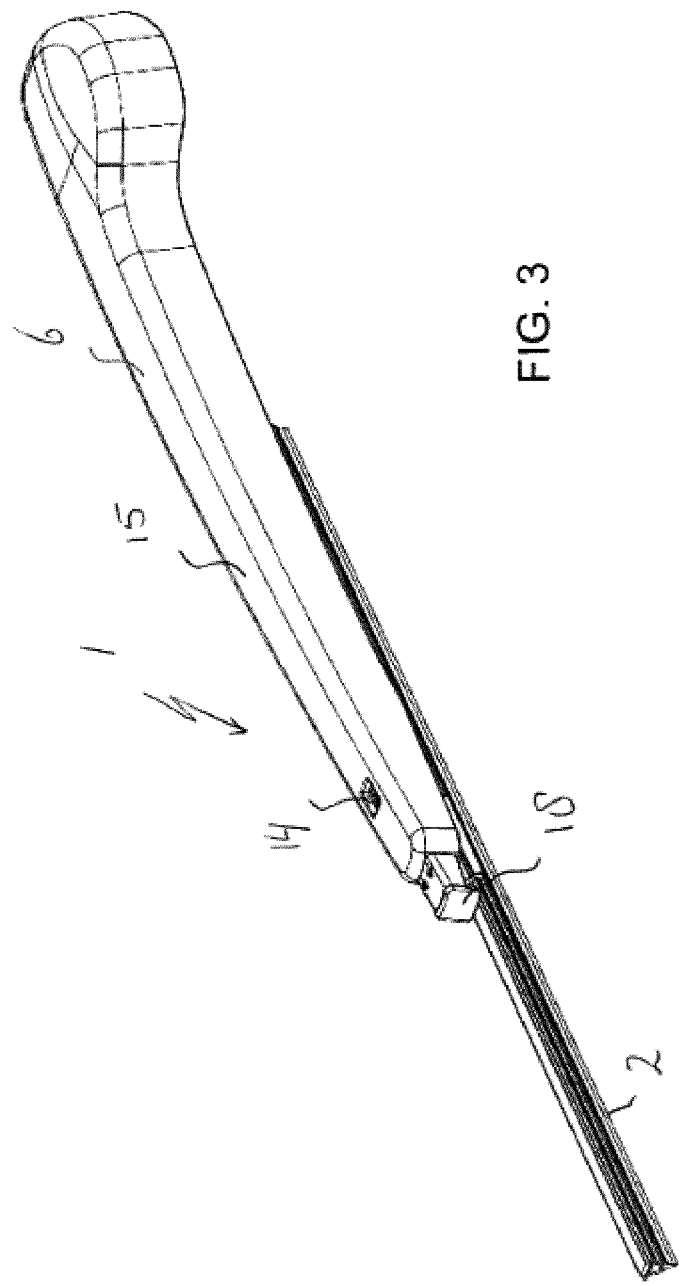

Referring to FIGS. 1 through 3 the connecting device 5 comprises two cylindrical protrusions 16 extending outwards on either side of the connecting device 5. These protrusions 16 pivotally engage in identically shaped cylindrical recesses 17 of the joint part 7, the protrusions 16 act as bearing surfaces at the location of a pivot axis in order to pivot the joint part 7 (and the oscillating arm 6 attached thereto) about the pivot axis near one end of the oscillating arm 6. The protrusions 16 are preferably in one piece with the connecting device 5. In the alternative, the protrusions 16 are part of a single pivot pin perpendicular to the connecting device 5.

FIGS. 1 through 4 show the steps of mounting the connecting device 5/joint part 7 with the wiper blade 2 onto the oscillating arm 6. The oscillating arm 8 and the joint part 9 are interconnected by sliding from the outside the joint part 7 in longitudinal direction inside the U-shaped cross-section of the oscillating arm 6. During this sliding movement the resilient tongue 13 is initially pushed in against a spring force and then allowed to spring back into the hole 14, thus snapping, that is clipping the resilient tongue 13 into the hole 14. This is a so-called bayonet-connection. The oscillating arm 6 together with the wiper blade 2 is then ready for use. By subsequently pushing in again the resilient tongue 13 against the spring force (as if it were a push button), the connecting device 5/joint part 7 together with the wiper blade 2 may be released from the oscillating arm 6. Dismounting the connecting device 5/joint part 7 with the wiper blade 2 from the oscillating arm 6 is thus realized by sliding the connecting device 5/joint part 9 together with the wiper blade 2 in longitudinal direction away from the oscillating arm 6. The hinge axis 17 of the joint part 7 is facing away from the free end of the oscillating arm 6.

As can be seen from FIG. 4, in mounted position an end side 18 of the joint part 7 closes the U-shaped cross-section thereof from the outside, wherein the end side 18 being only a very small part of the joint part 7 is visible from the outside. The end side 18 of the joint part 7 is flush with the legs 11 and the base 15 of the U-shaped cross-section of the oscillating arm 6 at the location of the free end of the oscillating arm 6. Hence, edges of the end side 18 of the joint part 7 are overlapped by the base 15 and the legs 11 of the oscillating arm 6.

The invention is not restricted to the variants shown in the drawing, but it also extends to other embodiments that fall within the scope of the appended claims.

The invention claimed is:

1. A windscreen wiper device comprising:
   an elastic, elongated carrier element;
   an elongated wiper blade of a flexible material, adapted to be placed in abutment with a windscreen to be wiped, wherein said wiper blade includes at least one longitudinal groove, in which a longitudinal strip of the said carrier element is disposed;
   a connecting device;
   an elongated oscillating arm, wherein said oscillating arm is pivotally connectable to said connecting device about a pivot axis near a free terminal end thereof, with the interposition of a joint part, wherein said joint part comprises at least one resilient tongue engaging in a correspondingly shaped hole provided in said oscillating arm spaced from said free terminal end, and wherein said resilient tongue is rotatable along an hinge axis between an outward position retaining the wiper blade onto the oscillating arm and an inward position releasing the wiper blade from the oscillating arm, wherein said oscillating arm has an at least substantially U-shaped cross-section at the location of its connection to said joint part, and wherein said joint part is positioned at least substantially within the U-shaped cross-section of said oscillating arm, wherein said oscillating arm and said joint part are interconnected by introduction of a first end of said joint part between legs of the U-shaped cross-section of said oscillating arm in a longitudinal direction of said wiper blade, wherein a second end of said joint part opposite said first end includes a surface with a plurality of adjoining, outwardly facing side edges partially therearound, said surface aligned with and surrounded by said free terminal end of said oscillating arm such that said plurality of adjoining side edges are covered by inwardly facing side edges of the free terminal end, wherein said surface closes said U-shaped cross-section of said oscillating arm.

2. A windscreen wiper device according to claim 1, wherein said oscillating arm and said joint part are interconnected by introduction of said joint part between legs of the U-shaped cross-section of said oscillating arm in longitudinal direction of said wiper blade from an outside thereof.

3. A windscreen wiper device according to claim 1, wherein said oscillating arm and said joint part are interconnected by sliding said joint part between legs of the U-shaped cross-section of said oscillating arm in longitudinal direction of said wiper blade.

4. A windscreen wiper device according to claim 1, wherein the hole of said oscillating arm is provided in a base of the U-shaped cross-section thereof.

5. A windscreen wiper device according to claim 4, wherein the hole has a closed circumference.

6. A windscreen wiper device according to claim 1, wherein said joint part is made of plastic.

7. A windscreen wiper device according to claim 1, wherein said joint part is attached to said connecting device by pivotally engaging protrusions of said connecting device at the location of said pivot axis, in recesses provided in said joint part.

8. A windscreen wiper device according to claim 7, wherein the protrusions extend outwards on either side of said connecting device, and wherein the protrusions are at least substantially cylindrical.

9. A windscreen wiper device according to claim 1, wherein said joint part has an at least substantially U-shaped cross-section at the location of its attachment to said connecting device, and wherein said joint part in each leg of said U-shaped cross-section is provided with a recess provided coaxially with said pivot axis.

* * * * *